July 17, 1951 W. H. STOUT 2,561,296
SELF-DRAINING IRRIGATION LINE
Filed March 14, 1950 3 Sheets—Sheet 1
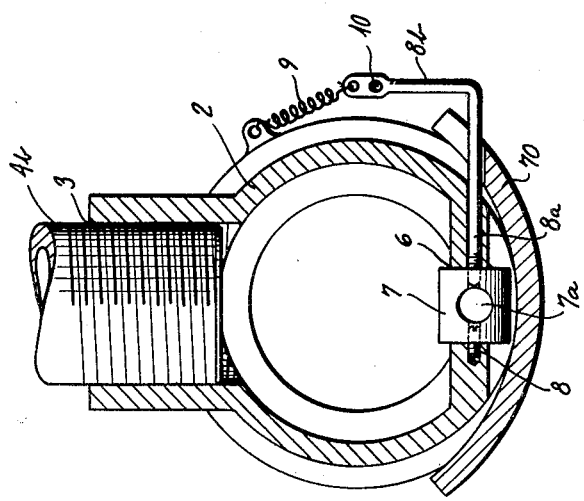
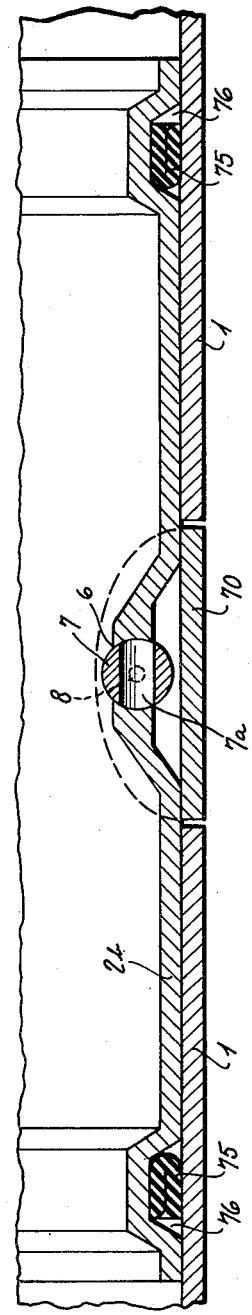
INVENTOR.
WILLIAM H. STOUT
BY Naylor and Lassagne
ATTORNEYS

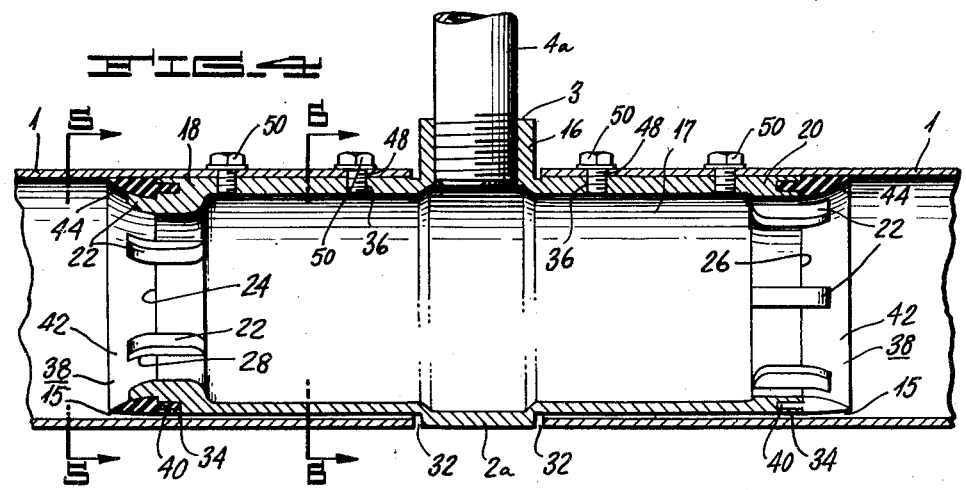
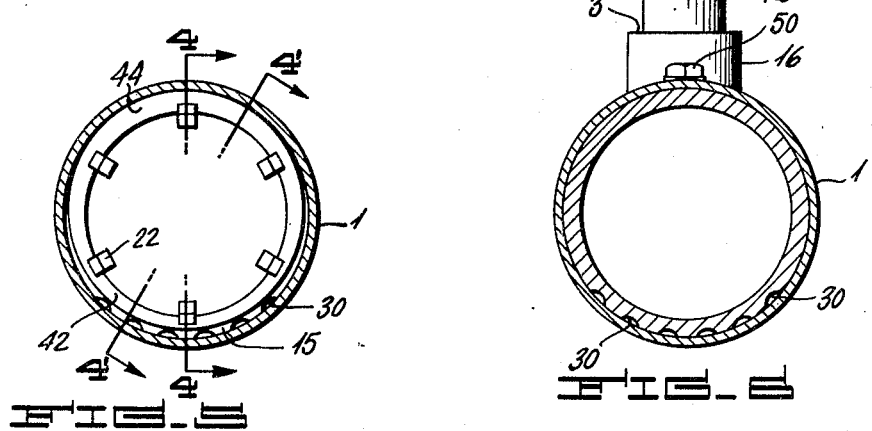
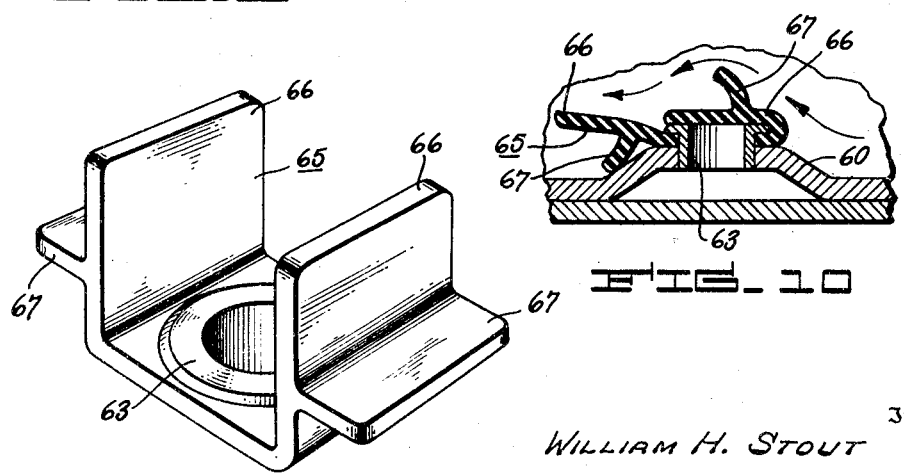

July 17, 1951 W. H. STOUT 2,561,296
SELF-DRAINING IRRIGATION LINE
Filed March 14, 1950 3 Sheets-Sheet 3
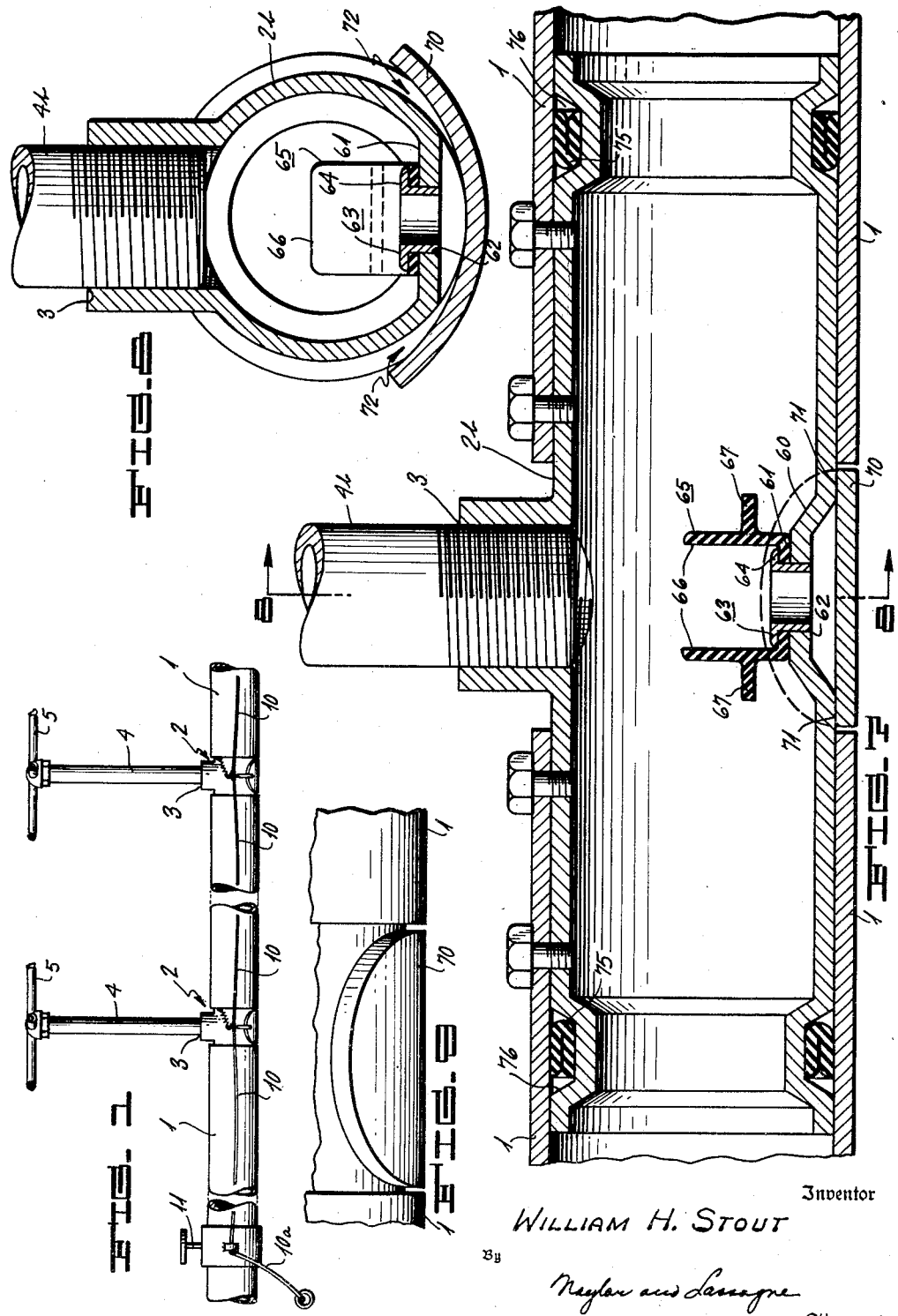
Inventor
WILLIAM H. STOUT
By
Naylor and Lasagne
Attorneys Patented July 17, 1951

2,561,296

UNITED STATES PATENT OFFICE 2,561,296

SELF-DRAINING IRRIGATION LINE

William H. Stout, Portland, Oreg.

Application March 14, 1950, Serial No. 149,579

6 Claims. (Cl. 137—78)

The present invention relates to systems for the distribution of irrigation water, and more particularly to improvements in such systems of the type in which sections of portable conduit provided with spaced sprinkler heads are used to irrigate, successively, adjacent portions of a field; the conduit sections being moved progressively to different positions as the irrigation of each section is completed.

Systems of the type to which the present invention is directed comprise essentially a plurality of sections of pipe or similar conduit connected by couplings in the upper portions of which are disposed water distributing outlets in the form of upwardly extending pipes surmounted by conventional sprinkler heads. In the employment of such systems for irrigation purposes the conduit is positioned centrally of a strip of land to be irrigated, and water is supplied as by a pump to one end of the conduit, the other end of which is closed so that the water passes through the several water distributing outlets and is sprayed over the adjacent area. When the irrigation of the area reached by the water from the sprinkler heads is completed, the water is shut off and the entire conduit is moved to another location, usually adjacent the first, where irrigation is resumed in the same manner.

As such systems were first used, it was the practice to disconnect the several pipe sections from their couplings before moving them to a new location as above described and to reconnect them to their couplings at a new location, but in view of the time and effort required for such disconnection and reassembly, various ways have been developed of transporting such conduits from one location to another without requiring them to be disconnected and reassembled. According to one such method which is described and claimed in my application Serial No. 28,239 filed May 20, 1948 for "Method of Transferring Irrigation Pipe," a large number of coupled sections of pipe are moved generally endwise along an undulatory path by means of a tractor or the like coupled to one end thereof; crop damage being prevented by the use of suitable guides to confine the path of movement of the pipe during such a towing operation. Other methods which have been developed include one in which a large number of coupled sections of pipe mounted upon wheels elevating the conduit thus formed a sufficient distance above the ground to avoid crop damage during movement may be rolled in a direction at right angles to the longitudinal axis of the conduit upon such wheels.

Every such attempt to move large numbers of coupled sections of irrigation pipe has, however, been handicapped by the weight of the water which remains in the conduit after the supply has been shut off. Due to this factor the number of coupled sections which could be moved as a unit has been very limited, and attempts to aviod this limitation, as by uncapping the end of the conduit for drainage or intentionally providing for a degree of leakage at the gaskets between the pipe sections and couplers have been unsatisfactory because end drainage in the case of a lengthy conduit not only requires that the user travel to the end of the conduit and uncap and recap it, but is very slow, and because the provision of any degree of leakage at the gaskets is undesirable for obvious reasons.

According to the present invention means are provided for rapidly and completely draining such an irrigation conduit, and reclosing the drainage apertures without requiring the operator to move from the station at which he shuts off the water supply to the conduit. Rapid and complete drainage of the conduit is secured by disposing a series of drain apertures along the lower portion of the conduit throughout substantially its entire length, and valving means are associated with each such drain aperture which are capable of being controlled by the operator from his station at the supply valve so that the drain apertures may be opened and reclosed without requiring him to leave the station.

While it is contemplated that spring-closed valves capable of being opened by a remote control actuated from the operator's station may be used for this purpose, the preferred forms of the invention utilize automatically operated valves which are responsive to fluid force in the conduit so that they will close automatically when the supply valve is opened by the operator and will open automatically when the supply valve is closed by the operator; making a separate drain valve actuation unnecessary.

The automatic valving means employed in connection with the present invention may be responsive to fluid force either in the form of fluid pressure within the conduit or merely to the velocity of fluid flowing through the conduit to close the drain apertures. Velocity responsive valving means are preferred, however, because they act more promptly than the pressure responsive valving means and close the drain apertures as the irrigation water first reaches them, so that pressure is built up more quickly in the conduit and in practice a substantially longer conduit can be employed.

The present application is a continuation-in-part of the joint application of Stout and Pearson, Serial No. 37,105 filed July 6, 1948 for a Self-Draining Pipe Joint and of the joint application of Stout and Terrill, Serial No. 70,096 filed January 14, 1949, for a Drain Valve for Pipe Lines, now Patent No. 2,512,695 dated June 27, 1950, disclosing and claiming particular valve mechanisms adapted for use in connection with the present invention.

The construction and mode of operation of two preferred embodiments of the present invention will be best understood from the following description when read in connection with the accompanying drawings, in which:

Figure 1 is a view in side elevation of a portion of an irrigation conduit in which the present invention is embodied, illustrating a remote drain-valve control adapted for actuation from the operator's station at the supply valve;

Figure 2 is a view in longitudinal section of a portion of the conduit of Figure 1 adjacent the coupler and illustrating a manually controlled drain valve employed in the combination of the present invention;

Figure 3 is a sectional view taken along the line 3—3 of Figure 2;

Figure 4 is a view in longitudinal section of a portion of a conduit such as that shown in Figure 1 adjacent a coupler embodying a valving mechanism responsive to fluid pressure in the conduit; the left-hand end of the coupler being shown as a section along the lines 4—4 of Figure 5 and the right-hand end of the coupler being shown as a section taken along the line 4'—4' of Figure 5;

Figure 5 is a sectional view taken along the line 5—5 of Figure 4;

Figure 6 is a view in section taken along the line 6—6 of Figure 4;

Figure 7 is a view in longitudinal section of a modified form of coupler in which the valving means is responsive to the velocity of fluid flowing through the conduit;

Figure 8 is a sectional view taken on the lines 8—8 of Figure 7;

Figure 9 is a detail view of the lower central portion of this coupler;

Figure 10 is a detail sectional view of the valving means of Figure 7 illustrating the action of the same when subjected to the action of the fluid flowing through the pipe; and Figure 11 is a detail view in perspective of the valving means of Figure 7.

As shown in Figure 1, the irrigation system of the present invention comprises a plurality of sections of pipe 1 connected by couplers generally designated 2 having a plurality of water distributing outlets 3 disposed one in each coupler. In practice these water distributing outlets usually receive stand pipes 4 which are surmounted by conventional sprinkler heads 5.

In the form of the invention illustrated in Figures 1, 2 and 3 there are drain apertures disposed along the lower portion of the conduit consisting of apertures 6 controlled by valves 7 rotatably mounted by pins 8 and 8a in the body of the coupler 2. The pin 8a extends through the side of the coupler and is provided with an upwardly extending portion 8b. A tension spring 9 is disposed between the upper end of the portion 8b and an anchorage on the body of the coupler, so as to normally maintain the valve 7 in the position shown in Figures 2 and 3, in which a port 7a therethrough is out of communication with the interior of the coupler. A cable or cord 10 is releasably connected to the upper ends of all of the portion 8b of the pins 8a and terminates in an end portion 10a adjacent a water supply valve 11 at the end of the conduit.

When it is desired to move a conduit embodying this form of the invention, the valve 11 is operated to shut off the water supply and the end portion 10a of cable 10 is pulled. This rotates all of the valves 7 so that their ports 7a communicate with the interior of their couplers and with the space between guard plate 70 and the coupler, so that the water remaining in the conduit may drain onto the ground, past the outer edges of the guard plate as more particularly described in connection with Figures 7, 8 and 9. When the pull on cable 10 is relaxed, springs 9 reclose each valve 7 so that irrigation may be resumed.

In the form of the invention illustrated in Figures 2, 3 and 4, there are normally open drain apertures disposed along the lower portion of the conduit consisting of passages 15 extending between the interior of the pipe sections 1 and the exterior of the couplings 2a, as illustrated in Figure 4, and the valving means disposed adjacent each of these drain apertures is responsive to fluid force in the conduit in the form of pressure.

Referring to the drawing for more specific details of the invention, the coupling comprises a relatively short length of generally cylindrical pipe, indicated generally at 2a, having a boss 16 carrying a header pipe 4a in communication with the space 17 within the coupler. The coupler is preferably symmetrical with respect to the boss 16 and each of the end portions 18 and 20 are provided with a plurality of spaced fingers 22, preferably integral with the coupler, and extending beyond the end edges 24 and 26 thereof. The fingers 22 are provided with semi-concave outer surfaces 28. The end portions 18 and 20 of the coupler are further characterized by a plurality of spaced relatively long flutings or grooves 30 in the underside thereof extending from the end edges 24 and 26 to circumferental grooves 32 adjacent the boss 16; circular slots 34 in the end edges 24 and 26, said slots being concentric with respect to said end edges; and internally threaded bolt holes 36.

Flexible gaskets 38, preferably of rubber, having rib portions 40 carried within the slots 34 and sealing lip portions 42 eccentric with respect to the rib portions are carried by the coupler and are provided with arcuate inner surfaces 44 complementary to the surfaces 28 of the fingers 22. The fingers serve as buttressing elements for the sealing lip portions 42 of the gaskets and prevent inward movement of said portions from their position shown in Figures 4 and 5. The provision of dual gaskets gives efficient initial closing action under flow of water in either direction through the coupler.

Pipe lengths 1 adapted to be joined for operative use by the coupler 2a are sleeved over the end portions 18 and 20 of the coupler until bolt holes 48 in said pipe lengths 46 are brought into registry with the bolt holes 36, whereupon the pipe lengths are secured to the coupler by bolts 50 threadably engaged with the holes 36 through holes 48. Washers 52 are interposed between the pipe 10 and the heads of the bolts 50.

The pipe lengths terminate short of the boss 16 so as to leave the circumferential grooves 32 in communication with the atmosphere.

In the above description of the gaskets 38, mention was made of the eccentricity of the sealing lip portions 42 with respect to the rib portions 40, the latter being concentric with respect to the ends of the coupler 2a, and it will now be noted that the sealing lip portions 42 are eccentric with respect to the pipe lengths 1, said portions 42 being in engagement with the upper part of the inner surfaces of the pipes 1, but being progressively separated therefrom towards the sides and bottom of the pipes 1 to provide the passage 15 having its maximum transverse dimension at the lowermost parts of the pipes 1, as best shown in Figure 5, said passage 15 being of sufficient width to disclose the ends of the flutings 30 to provide for communication between the inside of the pipes 1 and coupler 2a and the atmosphere through the passage 15, the flutings 30 and the grooves 32.

Assuming that the coupler 2a and pipe lengths 1 of Figure 4 are one of many such combinations interconnected and in position for use for irrigation purposes, as shown in Figure 1, and that a source of water supply is connected to the resultant irrigation line through a pump, the incoming water flowing through the pipe will quite rapidly fill the pipe while some of the water passes through the passages 15 and the flutings 30 to the grooves 32 and onto the ground. The flow through the open passageways described will serve to wash the flutings free of dirt which may have been introduced herein if the line was dragged along the ground to its position of present use. It is to be noted that the end portions 18 and 20 of the coupler, and therefore the flutings 30 therein, are sufficiently long to render it unlikely that any dirt will have travelled the full length of the flutings and into the passages 15 during the positioning of the pipe line.

While the flutings are being washed clean, the water level within the pipe rapidly rises until the water fills the pipe, at which time the effective water pressure urges the sealing lip portions 42 of the gaskets outwardly to close the passages 15 and seal the pipe line against leakage. The passages 15 are progressively closed; that is, first the narrowest or upper portions of the passages are closed by a forcing of the sealing lips of the gaskets against the surfaces of the pipes 1, and the closure proceeds progressively until the passages 15 are closed at their widest or lowermost portions, the gasket opposed to the direction of flow being subjected to greater initial pressure being closed first. If it should happen that the flutings 30 were sufficiently jammed with dirt so that the dirt was not displaced by the water outflow during the filling of the pipe, the progressive closure of the passages 15 to a point where only the ends of the flutings are disclosed will serve to concentrate or focus the effective water pressure along the flutings to eject the difficultly dislodgable dirt. Until this dirt is dislodged and washed out of the flutings to bring the passages 15 into communication with the atmosphere, the passages will not be fully closed by the sealing lips since the back pressure against complete closing will balance the pressure tending to fully close the passages. It is only when the flutings are free of dirt that the back pressure becomes atmospheric pressure, which is then over-balanced by the fluid pressure force to fully close the passages 15. When the pipe is full of water and sealed against leakage by the gaskets, the water is forced into the header pipes 4a to issue from spray heads 14 or the like for irrigation purposes.

Following sufficient irrigation of the land adjacent the pipe, the pipe is readied for movement to another position by shutting off the water supply, whereupon the fluid pressure within the pipe line drops sufficiently to allow the natural resiliency of the gaskets 38 together with the added force of atmospheric pressure to overcome the fluid pressure and to open the passages 15 in reverse order to the sequence of closing thereof to first disclose the flutings 30 and then the progressively narrower portions of the passages 15. As the flutings are diclosed, the water in the pipe passes therethrough to the grooves 32 and then onto the ground, and the pipe is drained in this manner to decrease its weight for the ensuing portage operation to relocate the pipe.

In the embodiment illustrated in Figures 7 to 11, inclusive, the valving means are responsive to fluid force in the form of velocity to close the normally open drain apertures, and by employing this form of valving means, closure of the drain apertures is effected as soon as water flowing through the conduit reaches the valving means; it being unnecessary for pressure to be built up in the line.

As shown in Figure 7, the underside of the coupling 2b is formed with an indentation 60 providing a flat ledge 61 internally of the coupling and extending across the periphery thereof on a substantially straight line or chord as shown in Figure 8. The ledge is formed with a central aperture 62 in which there is fitted and secured a grommet or collar 63, having a top peripheral flange 64 which engages the base portion of a valve 65. The valve 65 is formed with two oppositely positioned identical flaps 66 which normally extend in substantially parallel planes from the base portion of the valve. When the liquid flows through the pipe line, the moving liquid will exert a force against the resilient flaps bending the flap on the side from which the flow is coming downward over the top of the grommet or collar 63, as shown in Figure 10, where it is firmly held so long as pressure within the pipe line is maintained. The opposite flap 66 will be caused to lie idle, as illustrated, and relief of pressure will cause the flaps 66 to spring upright and open the port for drainage. It will be understood that provision of dual flaps is to assure operation of the valve in either direction of water flow, and that one flap only is required if water flow is always to be in the same direction.

With the relation of the coupler 2b and pipe section ends shown in Figures 7 and 8, the indentation in the coupler 2b under which the drainage aperture produced by the collar 63 opens, should be guarded to prevent plugging of the opening by mud or dirt. This is effected by the provision of a guard plate 70 preferably in the form of a circular disc bent into arcuate form on a curve of greater radius than that of the coupler 2b. This disc bridges the depression in the outer surface of coupler 2b and has its opposite margins axially of the coupling as at 71 fixed thereto as by welding or bracing. Due to the greater curve of the plate, water may escape between its lateral portions and the adjacent portions of the coupling through the openings 72, but the edges of the lateral portions being above the ground contacting surface will tend to prevent free entrance and packing of soil to an extent such as the flow of escaping water could not discharge, and since the openings 72 are at a right angle to the axis of the pipe line, dirt and debris will not enter them if the line is dragged from one location to another. The manner in which the pipe sections 1 are connected to the coupler 2b is similar, as shown, to the manner of connection of such pipe sections to the form of coupler shown in Figures 4 to 6; it being desirable, however, to provide sealing gaskets 75 seated in indentations 76 of the coupler 2b to prevent leakage of fluid between the pipe sections and the coupler walls.

The embodiments of the invention described herein provide simple, efficient and reliable devices for draining pipe lines under the conditions referred to, and while these specific embodiments show various forms in which the invention may be incorporated, it will be understood that variations in details of construction are possible without departure from the scope of the invention as hereinafter claimed.

What is claimed is:

1. In apparatus of the character described, a portable conduit of coupled pipe sections having a plurality of water distributing outlets disposed along the upper portion thereof, a plurality of drain apertures disposed along the lower portion of said conduit, a drain valve contained entirely within the peripheral dimensions of said pipe sections at each of said drain apertures for opening and closing the same, and a control station having means for controlling the flow of irrigation water into said conduit and the opening and closing of said drain valves.

2. In apparatus of the character described, a portable conduit of coupled pipe sections having a plurality of water distributing outlets disposed along the upper portion thereof, a plurality of drain apertures disposed along the lower portion of said conduit, a drain valve contained entirely within the peripheral dimensions of said pipe sections at each of said drain apertures including means responsive to fluid force in said conduit for closing said drain apertures; said means being also responsive to reduction of fluid pressure in said conduit to reopen said drain apertures, and a control station having means for controlling the flow of irrigation water into said conduit and thereby to control the opening and closing of said drain valves.

3. In apparatus of the character described, a portable conduit of coupled pipe sections having a plurality of water distributing outlets disposed along the upper portion thereof, a plurality of drain apertures disposed along the lower portion of said conduit, a drain valve contained entirely within the peripheral dimensions of said pipe sections at each of said drain apertures including means responsive to the velocity of fluid flowing through said conduit for closing said drain apertures; said means being also responsive to reduction of fluid pressure in said conduit to reopen said drain apertures, and a control station having means for controlling the flow of irrigation water into said conduit and thereby to control the opening and closing of said drain valves.

4. In apparatus of the character described, a portable conduit of coupled pipe sections having a plurality of water distributing outlets disposed along the upper portion thereof, a plurality of drain apertures disposed along the lower portion of said conduit, a drain valve contained entirely within the peripheral dimensions of said pipe sections at each of said drain apertures including means responsive to increase of fluid pressure in said conduit to close said drain aperture; said means being also responsive to reduction of fluid pressure in said conduit to reopen said drain apertures, and a control station having means for controlling the flow of irrigation water into said conduit and thereby to control the opening and closing of said drain valves.

5. A portable irrigation system of the character described comprising a conduit formed of a plurality of coupled pipe sections and having a plurality of water distributing outlets spaced along the upper portion thereof; the lower portion of said conduit presenting a face free from projections tending to resist axial sliding movement of the conduit along the surface of the ground, a plurality of drain apertures spaced along the lowermost portion of said conduit, a drain valve located at each of said apertures; each of said valves being disposed entirely above its respective drain aperture and within the peripheral dimensions of said pipe sections and having an operating means extending into the direct path of fluid flowing through said conduit and responsive to the velocity of such fluid to close its associated drain aperture; said means being also responsive to reduction of fluid pressure and velocity in said conduit to reopen said aperture, and a control station having means for controlling the flow of irrigation water into said conduit.

6. A portable irrigation system according to claim 5 in which each of said drain apertures is provided externally thereof with a guard member secured in the path of fluid exiting from said aperture.

WILLIAM H. STOUT.

No references cited.